3,494,997
PROCESS FOR THE MANUFACTURE OF MOLDS
Werner Dittrich, Herten, Baden, Walter Krings, Rheinfelden, Germany, Hans Schneider, Winterthur, Switzerland, and Gerhard Hauck, Ranzel-Kolonie, Germany, assignors to Dynamit Nobel A.G., Troisdorf, Bezirk Cologne, Germany, a corporation of Germany
No Drawing. Continuation of application Ser. No. 470,234, July 7, 1965. This application Apr. 8, 1969, Ser. No. 816,165
Claims priority, application Germany, July 9 1964, D 44,886
Int. Cl. B29c 1/02
U.S. Cl. 264—221
10 Claims

ABSTRACT OF THE DISCLOSURE

In the production of molds of refractory powder, a composition comprising the refractory powder and a binder composed of heterogeneous alcoholates, is used. The alcoholate includes at least two elements of the group boron, aluminum, silicon, tin, lead, titanium, and zirconium.

---

This application is a continuation of application Ser. No. 470,234, filed July 7, 1965, and now abandoned.

Molds for precision casting are made by investing a model made, for example, of wax, urea, polystyrene or other such material, with a liquid slurry. The slurry is a suspension of finely divided refractory materials, such as quartz, sillimanite, zirconium silicate, zirconium oxide or other such substances in a liquid binding agent. The binding agents hitherto have been ethyl silicate hydrolysis products, colloidal silicic acid or water glass.

The investment of the models is generally performed by a single or repeated dipping or spraying on of the ceramic compound, followed by the sprinking on of the coating that is appropriate in each case. In this manner a more or less thick shell is produced on the model. After the shell hardens the model with the shell can be packed in a casting box with loose, dry material, such as sand, or with a wet material that contains a refractory binder. In many cases, however, the shell is already strong enough to withstand the further steps of the casting process.

The model is removed from the mold by melting, dissolving, or burning it out. The mold, which can be hollow, thus produced is then fired at approximately 1000° C. and is then ready for casting.

The binders which have hitherto been used in this process do not always meet the requirements for the service. In the case of urea models, for example, it is not possible to use binders containing water, since they soften the models and thus spoil their surface. When colloidal silicic acid, which is produced by the hydrolysis of water glass followed by dialysis, is used as a binder in coatings on wax models, the long drying time between the individual dippings has proven especially disadvantageous. The use of water glass as a binder for precision casting molds is not favored on account of the poor refractory properties of this binder because, particularly in the case of large castings or also in the casting of high-alloy steel at high casting temperatures, reactions can occur between the mold and the metal and can result in surfaces of poor quality.

It has now been found that the above-mentioned disadvantages can be avoided if, in processes for the manufacture of precision casting molds by repeatedly investing lost models with a viscous mass of refractory powders in binding agents based on metal alcoholates and then firing at high temperatures after removal of the models, condensed, heterogeneous alcoholates are used as the sole binding agent or as a part of the binding agent, which are in liquid form or dissolved in organic solvents, partially hydrolyzed if desired, and which contain at least two elements of the series of boron, aluminum, silicon, tin, lead, titanium and zirconium. The binding agent can be made according to German patent application D 43,248 (U.S. application Ser. No. 420,824, filed Dec. 23, 1964) and assigned to the asignee of the present application, for example. Preferably, the alcoholates are derived from alcohols with about 1 to 4 carbon atoms or their mixtures. The heterogeneous alcoholates are in liquid phase, either by reason of the alcoholate being liquid or by reason of use of solvent. It is expedient for the binding agents to contain additionally known hardening accelerators, such as titanium alcoholates, silicon alcoholates, amines or their mixtures, which may be partially hydrolyzed if desired. The accelerators are used conventionally in known amounts. Under certain circumstances it is sufficient to use the above-mentioned binding agents only for the production of one or more (preferably at least two) ground coats on the lost models, while additional outer coats can be made with binding agents of the prior art. The amount of binder used is conventional.

The invention particularly contemplates the application of an initial coat or coats according to the invention, followed by the application of further coating compositions wherein the binder is different, e.g. a conventional binder. In such procedure the advantage of applying the new compositions directly to the model is realized.

EXAMPLE 1

1000 parts by weight of silicon-aluminum alcoholate and 2500 parts by weight of sillimanite powder are mixed together. This produces a slurry, into which the models are now dipped. After dipping the models are sprinkled with fine sillimanite and exposed to air, whereupon the moisture in the air brings about a hydrolysis of the silicon-aluminum alcoholate. The alcohol thus evolved evaporates and the coating dries on the models. Then the dipping is repeated until a shell of sufficient thickness has been produced on the model. The lost models are then removed from the shell, which is then fired at 1000° C. The result is a precision casting mold with an excellent interior surface and great strength.

EXAMPLE 2

A hydrolyzed solution is made from 1000 parts by weight of silicon-aluminum alcoholate, 200 parts by weight of isopropanol and 50 parts by weight of 1% hydrochloric acid, and 1700 parts by weight of ground quartz, are added. This composition is used to produce 2 successive coats on the model, fine quartz sand being sprinkled over each coat. The coated models are then shaken in dry sand in an iron flask and are burned out. The hollow mold that results is fired at 900° C. and is then ready for casting.

EXAMPLE 3

| | Wt.-parts |
|---|---|
| Silicon-aluminum alcoholate | 360 |
| Tetraethyl orthosilicate | 360 |
| Butyl titanate | 80 | are mixed together and 2400 wt.-parts of zirconium silicate flour are stirred in. Two coats of this composition are applied to a water-soluble model. Six additional coatings are applied with a known composition based on ethyl silicate condensed by partial hydrolysis. The time interval between each coat was 3 hours. Fine sillimanite was used for sprinkling after each coat. After the hardening the model is dissolved out and the mold is dried at 110° C. and baked at 1000° C.

EXAMPLE 4

| | Wt.-parts |
|---|---|
| Silicon aluminum alcoholate | 600 |
| Isopropanol | 240 |
| Triethylamine | 10 | are mixed together and form the liquid component of a ceramic dipping composition. The rest of the procedure is the same as in Example 3.

EXAMPLE 5

| | Wt.-parts |
|---|---|
| Silicon aluminum alcoholate | 800 |
| Titanium-aluminum alcoholate | 200 | are mixed together with 3000 wt.-parts of zirconium silicate powder. A model is dipped twice into this composition. The next 5 coates are made with an ethyl silicate base composition. The shell mold thus produced is of excellent quality.

EXAMPLE 6

| | Wt.-parts |
|---|---|
| Titanium-aluminum alcoholate | 250 |
| Ethyl silicate with 40% $SiO_2$ | 200 |
| Glycerine | 25 | are mixed with 1400 wt.-parts of zirconium silicate powder and applied in a thin coat to a model. The coating is not sprinkled with sand. It dries in 1½ hours. The next coatings are based on ethyl silicate, as described in Example 3.

The silicon-aluminum alcoholate mentioned in the foregoing examples has the following characteristics:

| | | |
|---|---|---|
| $SiO_2$ content | percent | 15.7 |
| $Al_2O_3$ content | do | 12.7 |
| Viscosity | cp | 27 |
| Density at 25° C. | | 1.0056 |
| Index of refraction | | 1.4190 |
| Flash point | ° C | 47 |

What is claimed is:

1. Process for the manufacture of molds wherein a model is coated with a composition comprising refractory powder and a binding agent, and is thereafter baked at high temperature, the refractory powder is chosen from the group of quartz, sillimanite, zirconium silicate, or zirconium oxide, and wherein the proportion of binder is such that the binder binds the refractory powder so that said mold is produced, characterized in that a heterogeneous alcoholate in liquid phase is used as binding agent of the composition, the heterogeneous alcoholoate containing at least two elements selected from the group consisting of boron, aluminum, silicon, tin, lead, titanium and zirconium.

2. Process according to claim 1, wherein the heterogeneous alcoholate is partially hydrolyzed.

3. Process according to claim 1, wherein the model is coated a plurality of times according to claim 1.

4. Process according to claim 1, wherein in addition to said heterogenous alcoholate said composition contains homogeneous alcoholate selected from the group consisting of titanium alcoholates, and silicon alcoholates.

5. Process according to claim 1, wherein in addition to the binder the model is coated initially with said composition and is thereafter coated with a composition comprising refractory powder and a binder free of said heterogeneous alcoholate.

6. Process according to claim 1, wherein the model is coated a plurality of times, the first two coats being of said composition and subsequent coats being of a composition comprising refractory powder and a binder free of said heterogeneous alcoholate.

7. Process according to claim 1, the alcohol groups of the alcoholates containing about 1–4 carbon atoms.

8. Process according to claim 1, wherein said high temperature is about 900–1000° C.

9. Process according to claim 4, wherein the alcoholate in addition to said heterogeneous alcoholate is partially hydrolyzed.

10. Process according to claim 1, wherein said composition contains at least one amine as hardening accelerator.

References Cited

UNITED STATES PATENTS

| 3,235,393 | 2/1966 | Emblem et al. | 106—38.2 |
| 3,326,950 | 6/1967 | Emblem et al. | 106—38.22 |

FOREIGN PATENTS

| 790,685 | 2/1958 | Great Britain. |

DONALD J. ARNOLD, Primary Examiner

U.S. Cl. X.R.

106—38.22; 117—70, 138.8, 168; 264—225

PO-1050
(5/69)

UNITED STATES PATENT OFFICE
CERTIFICATE OF CORRECTION

Patent No. 3,494,997          Dated Feb. 10, 1970

Inventor(s) Werner Dittrich et al.

It is certified that error appears in the above-identified patent and that said Letters Patent are hereby corrected as shown below:

Col. 4, lines 13 and 14, Claim 5, line 1, cancel "in addition to the binder."

SIGNED AND SEALED

JUL 7 1970

(SEAL)
Attest:

Edward M. Fletcher, J.
Attesting Officer

WILLIAM E. SCHUYLER, JR.
Commissioner of Patents